United States Patent
White et al.

(10) Patent No.: US 9,240,006 B2
(45) Date of Patent: Jan. 19, 2016

(54) WIRELESS TRANSACTIONS FOR ENHANCING CUSTOMER EXPERIENCE

(75) Inventors: Spencer Neil White, Norcross, GA (US); Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 49 days.

(21) Appl. No.: 13/308,180

(22) Filed: Nov. 30, 2011

(65) Prior Publication Data

US 2013/0138518 A1    May 30, 2013

(51) Int. Cl.
  G06Q 20/00   (2012.01)
  G06Q 20/20   (2012.01)
  G06Q 20/32   (2012.01)
  G06Q 20/36   (2012.01)

(52) U.S. Cl.
  CPC .......... *G06Q 20/204* (2013.01); *G06Q 20/20* (2013.01); *G06Q 20/325* (2013.01); *G06Q 20/3224* (2013.01); *G06Q 20/3276* (2013.01); *G06Q 20/3278* (2013.01); *G06Q 20/36* (2013.01)

(58) Field of Classification Search
  CPC .................................................. G06Q 20/20
  USPC .............................. 705/15, 16, 26.8, 27.2, 34
  See application file for complete search history.

(56) References Cited

U.S. PATENT DOCUMENTS

| | | | |
|---|---|---|---|
| 5,262,938 A * | 11/1993 | Rapoport et al. | 705/15 |
| 6,377,810 B1 * | 4/2002 | Geiger et al. | 455/456.2 |
| 6,856,975 B1 | 2/2005 | Inglis | |
| 7,024,174 B2 | 4/2006 | Nagy | |
| 7,343,344 B2 | 3/2008 | Tomoike | |
| 7,416,117 B1 * | 8/2008 | Morrison | 235/383 |
| 7,581,678 B2 | 9/2009 | Narendra | |
| 7,780,081 B1 * | 8/2010 | Liang | 235/383 |
| 7,945,477 B2 * | 5/2011 | Werbitt | 705/15 |
| 8,655,732 B1 * | 2/2014 | Wilinski et al. | 705/15 |
| 8,762,208 B2 * | 6/2014 | Hutcherson | 705/15 |
| 2002/0069165 A1 * | 6/2002 | O'Neil | 705/40 |
| 2002/0116274 A1 * | 8/2002 | Hind et al. | 705/23 |
| 2002/0121979 A1 * | 9/2002 | Smith | 340/572.1 |
| 2003/0034399 A1 * | 2/2003 | Wilz et al. | 235/462.45 |
| 2004/0058705 A1 | 3/2004 | Morgan | |
| 2005/0198318 A1 * | 9/2005 | von Mueller et al. | 709/228 |
| 2006/0143087 A1 * | 6/2006 | Tripp et al. | 705/15 |
| 2006/0186197 A1 * | 8/2006 | Rosenberg | 235/380 |
| 2006/0218040 A1 * | 9/2006 | Sabapathypillai | 705/15 |
| 2007/0210155 A1 * | 9/2007 | Swartz et al. | 235/383 |

(Continued)

OTHER PUBLICATIONS

Mike Sullivan, "Tabbed Out", Coolbars.com, Feb. 3, 2011, http://coolbars.com/Tabbed-Out-Bar-App.

(Continued)

*Primary Examiner* — Hunter Wilder
(74) *Attorney, Agent, or Firm* — Hartman & Citrin LLC

(57) ABSTRACT

Devices, systems, and methods are disclosed for facilitating a wireless transaction by coupling or associating an identifier to a location. The identifier is read, retrieved, or received by a customer's wireless communication device to connect to a POS terminal. Once connected, the wireless communication device sends a location identifier to the POS terminal, so that the POS terminal can associate the wireless communication device with the location. Once an association is established, the POS terminal then presents options. The POS terminal receives selections, and alerts a staff member of selections and the location. In many instances, the POS terminal also adds the selection to a bill or an invoice.

17 Claims, 12 Drawing Sheets

(56) References Cited

U.S. PATENT DOCUMENTS

| | | | |
|---|---|---|---|
| 2008/0274752 A1* | 11/2008 | Houri | 455/456.1 |
| 2008/0309389 A1* | 12/2008 | French et al. | 327/167 |
| 2009/0037286 A1* | 2/2009 | Foster | 705/21 |
| 2009/0039150 A1* | 2/2009 | Lay | 235/379 |
| 2009/0250758 A1* | 10/2009 | Isobe | 257/350 |
| 2009/0271276 A1 | 10/2009 | Roberts | |
| 2009/0298540 A1 | 12/2009 | Narendra | |
| 2010/0082481 A1* | 4/2010 | Lin et al. | G06Q 20/042 705/41 |
| 2010/0106607 A1* | 4/2010 | Riddiford et al. | 705/15 |
| 2010/0136918 A1* | 6/2010 | Bonner et al. | 455/66.1 |
| 2010/0169212 A1* | 7/2010 | Paintin | 705/40 |
| 2010/0174614 A1* | 7/2010 | Wu | 705/21 |
| 2010/0320266 A1 | 12/2010 | White | |
| 2011/0055917 A1* | 3/2011 | Wickstrom | 726/17 |
| 2011/0071914 A1* | 3/2011 | Beasley et al. | 705/21 |
| 2011/0093302 A1* | 4/2011 | Hernandez | 705/5 |
| 2011/0173041 A1* | 7/2011 | Breitenbach et al. | 705/7.13 |
| 2011/0173060 A1 | 7/2011 | Gallagher | |
| 2011/0173092 A1* | 7/2011 | Werbitt | 705/26.8 |
| 2011/0191196 A1* | 8/2011 | Orr et al. | 705/17 |
| 2011/0282942 A1* | 11/2011 | Berger et al. | 709/204 |
| 2012/0008838 A1* | 1/2012 | Guyon et al. | 382/128 |
| 2012/0050019 A1* | 3/2012 | Castro et al. | 340/286.09 |
| 2012/0076356 A1* | 3/2012 | Li et al. | 382/103 |
| 2012/0136754 A1* | 5/2012 | Underwood | 705/26.43 |
| 2012/0144452 A1* | 6/2012 | Dyor et al. | 726/4 |
| 2012/0162422 A1* | 6/2012 | Lester | 348/148 |
| 2012/0173396 A1* | 7/2012 | Melby et al. | 705/34 |
| 2012/0185383 A1* | 7/2012 | Demark et al. | 705/40 |
| 2012/0209714 A1* | 8/2012 | Douglas et al. | 705/14.58 |
| 2012/0209729 A1* | 8/2012 | Lovegreen | 705/15 |
| 2012/0214416 A1* | 8/2012 | Kent et al. | H04L 63/18 455/41.2 |
| 2012/0222055 A1* | 8/2012 | Schaefer et al. | 725/5 |
| 2013/0006816 A1* | 1/2013 | Nuzzi et al. | 705/27.1 |
| 2013/0006853 A1* | 1/2013 | Amundsen | 705/40 |
| 2014/0040048 A1* | 2/2014 | Hutcherson | 705/14.73 |
| 2014/0081778 A1* | 3/2014 | Underwood | 705/15 |
| 2014/0114776 A1* | 4/2014 | Solanki et al. | 705/15 |
| 2014/0244409 A1* | 8/2014 | Nathanel et al. | 705/15 |
| 2014/0324606 A1* | 10/2014 | Fortuna et al. | 705/15 |

OTHER PUBLICATIONS

Bobbie Johnson, "Apps Could Turn Your Smart Phone Into a Wallet", Technology Review, Jan. 24, 2011, http://www.technologyreview.com/printer_friendly_article.aspx?id=27125, published by MIT, US.

Venmo, LLC, "What is Venmo", Copyright 2009-2014, Retrieved Oct. 27, 2014 from https://help.venmo.com/customer/portal/article/1322558-what-is-venmo-.

Boomerang Ditigal, "About SpotMe", Copyright 2014, Retrieved Oct. 27, 2014 from http://www.getspotme.com/about.

PayPal, "Credit Card Scanning for Mobile Apps", Copyright 2014, Retrieved Oct. 27, 2014 from https://www.card.io/.

Goodtime Labs, Inc. "Downtown", Copyright 2014, Retrieved Oct. 27, 2014 from http://downtownapp.co/.

Braintree, "Case Study: LevelUp", Copyright 2008-2014, Retrieved Oct. 27, 2014 from https://www.braintreepayments.com/case-studies/levelup.

* cited by examiner

FIG. 5A  FIG. 5B

WIRELESS TRANSACTIONS FOR ENHANCING CUSTOMER EXPERIENCE

BACKGROUND OF THE SUBJECT DISCLOSURE

1. Field of Disclosure

The subject disclosure relates to wireless transactions. More specifically, the subject disclosure relates to facilitating wireless customer transactions.

2. Background of Disclosure

Many businesses, such as restaurants, place their point-of-sale devices away from the customer. Therefore, customers who choose to pay with a mobile telephone typically relinquish their mobile telephone so that the mobile telephone can be placed near the point-of-sale device to enable the transaction. For many mobile telephone users, this presents a problem of security and utility. Not only is the mobile telephone potentially exposed to unauthorized and unknown access, but the user is now completely without electronic communication. In today's world of smartphones with push mail, instant updates, and full web browsing capability, this can be a handicap depending on how much the user's lifestyle involves wireless communication. While a restaurant customer may in some instances feel comfortable in handing the mobile telephone to a trusted waiter, there are many instances where the same level of trust is not there, such as a baseball fan who will probably never feel comfortable passing his smartphone down a row of ten other fans just to pay for a hot dog.

SUMMARY OF THE SUBJECT DISCLOSURE

In one example embodiment, the subject disclosure may be a system including a point-of-sale (POS) terminal in communication with a wireless communication device of a customer, and a logic stored on the POS terminal for receiving a request at the POS terminal from the wireless communication device, the request including an identifier of a location at a premises associated with, for example served by, the POS terminal, the identifier received by the wireless communication device of the customer, the location being one of a plurality of locations at the premises associated with the POS terminal, and responding to the request.

In another example embodiment, the subject disclosure may be a method including receiving a request at a point-of-sale (POS) terminal from a wireless communication device, the request including an identifier of a location at a premises associated with, for example served by, the POS terminal, the identifier received by the wireless communication device of a customer, the location being one of a plurality of locations at the premises associated with the POS terminal, and responding to the request.

In yet another example embodiment, the subject disclosure may be a computer-readable storage medium storing computer-executable instructions, which when executed by at least one processor, configure the at least one processor to perform a method. The method includes receiving, by a wireless communication device, an identifier of a location of a customer, the location being one of a plurality of locations at a premises, each location associated with a respective identifier, and sending, by the wireless communication device, a request from the wireless communication device to a point-of-sale (POS) terminal, the request including the identifier.

BRIEF DESCRIPTION OF THE DRAWINGS

FIGS. 5A-5C show a place at a table in a restaurant for facilitating a customer transaction, according to an example embodiment of the subject disclosure.

DETAILED DESCRIPTION OF THE SUBJECT DISCLOSURE

Figure 1:
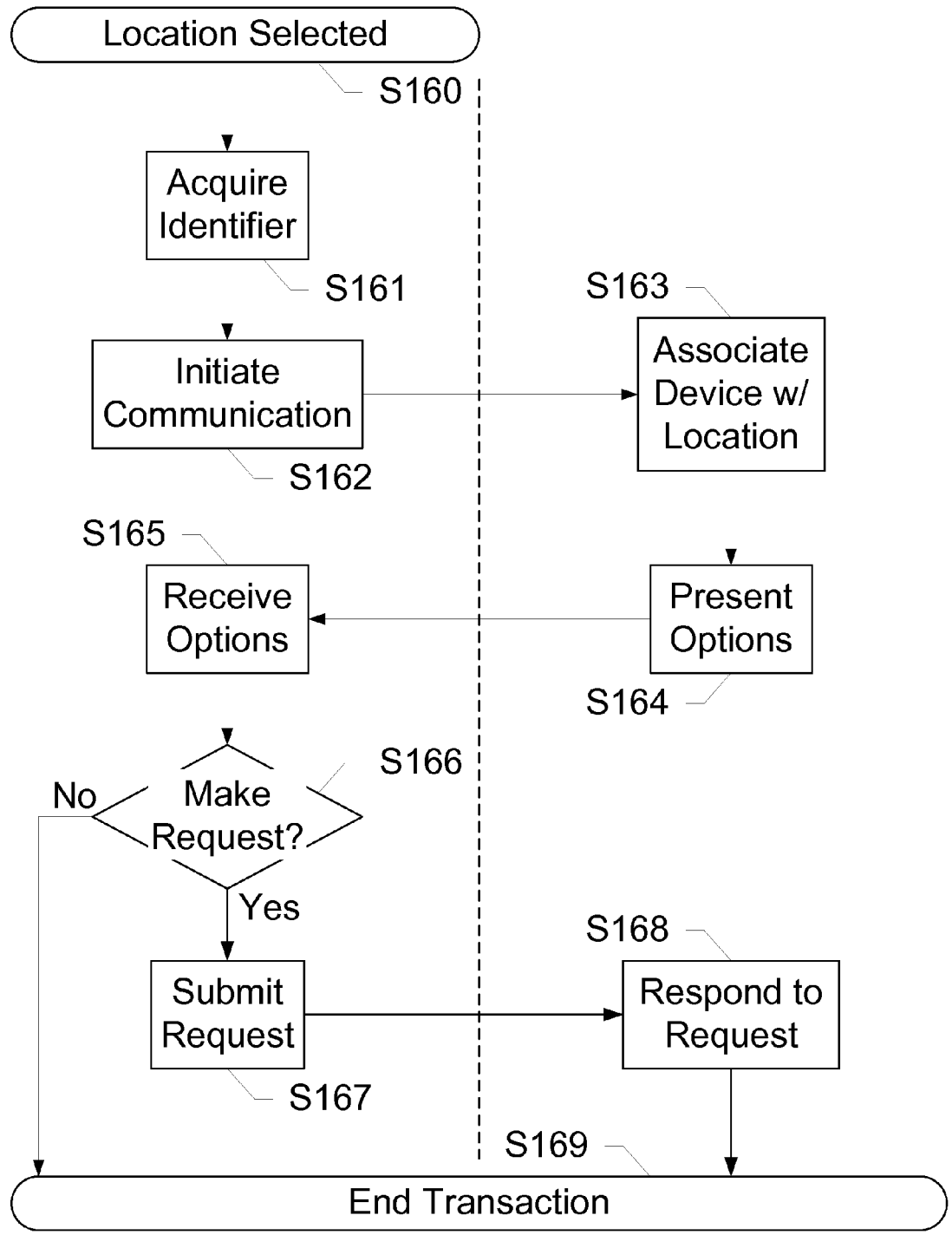
FIG. 1 shows a method for facilitating a customer transaction, according to an example embodiment of the subject disclosure.

The subject disclosure presents devices, systems, and methods for enhancing a customer experience by, for example, facilitating a customer transaction by coupling or associating an identifier to a location at a premises that may have a plurality of physical locations. For example, a restaurant, stadium, or theater premises may have a plurality of table and/or seat locations. As another example, a parking lot may have a plurality of parking space locations. Many other types of locations for various types of premises, according to an example embodiment.

It will be appreciated that the identifier may be comprised of more than one identifier. For example, in example embodiments, the identifier may include a point-of-sale (POS) identifier and a location identifier. An example POS identifier may include a network address (e.g., IP address, web address, etc.) that identifies one or more POS terminals serving a particular business or entity premises. A location identifier can identify a physical location (e.g., table, seat, etc.) at a premises that includes a plurality of physical locations. In an example embodiment, each location identifier may be unique such that it can be used to identify a respective physical location at a premises having a plurality of different physical locations.

As will be described herein, each identifier, including a respective location identifier and/or a POS identifier, can be coupled to a respective unique location at a premises. The identifier, which may be, for example, encoded or stored in a near field communication (NFC) tag, barcode, Quick Response (QR) code, or any present or future wireless media located at a respective location at a premises, may be read, retrieved, or received by a customer's wireless communication device. Once the wireless communication device reads, retrieves, or receives the POS identifier, the wireless communication device may use the POS identifier to connect to a POS terminal identified by the POS identifier. For example, if the POS identifier is a network address, the network address can be used to connect to the corresponding POS terminal. As another example, if the POS identifier is a web address or uniform resource locator (URL), the web address or URL can be used to connect to the corresponding POS terminal. Once connected, the wireless communication device may send the location identifier to the POS terminal, so that the POS terminal may then associate the wireless communication device with the location.

Once an association is established, the POS terminal may then present service options (e.g., view a menu, place an order, request service, pay a bill, etc.) to the wireless communication device, using any of the communication techniques in this disclosure, including, but not limited to, NFC, Wi-Fi, Zigbee, Bluetooth, cellular communications, etc. The customer may view these options on the wireless communication device using a browser, application, mobile application, text, etc. To select an option, or order a menu item, the wireless communication device, upon input from the user, may transmit the selection to the POS terminal. The POS terminal may receive and process the selection, and optionally alert a staff member of the selection and the location through a loudspeaker, pager, visual display, wireless communication with a remote device of a staff member, etc. In an example embodiment, the POS terminal may also be configured to receive a selection of a product or service from a wireless communication device, and in response to processing the selection, add the selection to a bill, an invoice, or order.

When the customer is ready to pay the bill, the wireless communication device may send a request to the POS terminal for the bill. The request may optionally include the identifier (e.g., location identifier), although in some embodiments the identifier may not be needed due to an earlier established association (e.g., within a predetermined time frame) between the wireless communication device and the respective location. The POS terminal may then respond by sending the itemized bill. If the customer has any questions about the bill or the payment process, then the customer can request assistance through the wireless communication device. Upon user command, the wireless communication device sends a request for assistance to the POS terminal, which alerts a staff member of the request and the location. In either case, the customer may review the bill, add a tip, and input payment information such as credit or debit card information (e.g., card number, expiration date, security code, etc.), or information for another type of electronic payment (e.g., PayPal, person-to-person (P2P) payment, etc.). Once payment is made, a confirmation may be sent from the POS terminal to the wireless communication device. The POS terminal may alert a staff member of the payment, or simply make this information available to the staff.

The foregoing provides a simplified summary that describes some aspects or embodiments of the subject disclosure. However, the summary is not an extensive overview of the disclosure. Indeed, additional or alternative embodiments of the subject disclosure may be available beyond those described above.

Indeed, there are many example embodiments of the subject disclosure. For simplicity, the following example embodiments present, for the most part, a minimal number of structure and components necessary to achieve the functions of the subject disclosure. In many of the following example embodiments, one device, network, terminal, memory, logic, etc. is shown where a plurality may be used to achieve the same function. Those having skill in the art will recognize these pluralities, which are within the scope of the present subject disclosure.

FIG. 1 shows a method for facilitating a customer transaction, according to an example embodiment of the subject disclosure. The method may begin as a customer selects a location at a business (S160). The location may be one of many locations available at the business for a customer to select, such as a seat at a table, a parking spot, etc., and coupled to or associated with each of these locations is an identifier, which can be read by a wireless communication device.

In an example embodiment, a wireless communication device may be an electronic device capable of wirelessly sending and receiving data, information, voice, etc. Examples of such devices may include, but are not limited to, cellular telephones, smart phones, personal digital assistants (PDAs), portable computers, tablet computers, consumer electronics, appliances, etc.

The customer may use his wireless communication device to acquire the identifier (S161). The identifier may include a POS identifier (e.g., a network address, web address, URL, etc. of a POS terminal) and a respective location identifier corresponding to a respective location (e.g., physical location) at a premises having a plurality of locations. The POS identifier (e.g., network address) may be any logical identifier used to distinguish the POS terminal from any number of other devices in communication with the network, such as an IP address, a combination of a public and private IP addresses, a SIP address, a unique name, etc. In an example embodiment, the form of the POS identifier may depend on the type of network. The network may be any private, local, or wide-area network, the Internet, a cloud-based network, or any combination thereof. The wireless communication device may use at least the POS identifier to initiate communication with the POS terminal (S162).

The POS terminal may be any device that is used to conduct a transaction. Examples of POS terminals include, but are not limited to, cash registers, kiosks, turnstiles, doors/gates, vending machines, automated teller machines, handheld barcode scanners such as those provided at supermarkets, NFC-enabled posters and advertisements, etc. POS terminal components may include, but are not limited to, processors, memory, operating logic including software for conducting transactions, and networking components such as transceivers, interfaces, etc.

Logic refers to any information, code, instruction, or data that may be executed to direct the operation of a system. Logic may be stored as computer-executable code or instructions on a computer-readable medium, which when executed by a processor carries out instructions on a computer system. Examples of computer-executable logic include, but are not limited to, software, applications, programs, operating systems, applets and sub-applications, coded functions, etc. Logic may also be composed of digital and/or analog hardware circuits, for example any digital IQ, analog IQ, etc., on a complementary metal-oxide-semiconductor (CMOS), silicon germanium (SiGe), silicon-on-insulator (SOI), etc., and other hardware circuits comprising logical AND, OR, XOR, NAND, NOR, and other logical operations. Logic may be formed from combinations of software and hardware.

Examples of computer-readable mediums that may comprise or store logic include, but are not limited to, RAM (random access memory), flash memory, ROM (read-only memory), EPROM (erasable programmable read-only memory), EEPROM (electrically erasable programmable read-only memory), hard drives, disks, diskettes, compact discs (CD), digital versatile discs (DVD), tapes, etc.

Examples of processors are computer processors (processing units), microprocessors, digital signal processors, controllers and microcontrollers, etc.

Referring back to FIG. 1, during initiation S162, the wireless communication device may also send a location identifier corresponding to a respective physical location at a premises having a plurality of locations. The location identifier may have been read, retrieved, or received by the wireless communication device from, for example, an NFC tag, barcode, QR code, or any present or future wireless media, available at the respective physical location. The location identifier may include at least enough information to distinguish the location from the other locations at the premises (e.g., business), which may include a seat number, a parking spot code, geographical coordinates, or other such differentiating variable. The POS terminal may receive this location identifier from the wireless communication device, and in response, associate the wireless communication device with the location identifier and/or the physical address associated with the location identifier (S163). Association S163 may be stored on a memory onboard the POS terminal, or on an external database or server accessible via the POS terminal directly or through another device or network. Once an association is established, the POS terminal may then transmit options (S164) to the wireless communication device. The options are predetermined by the business and include, in example embodiments, menu items, payment methods, assistance requests, previews, advertisements, etc. In further example embodiments, options may include further detailed options, such as a sub-menu within the initially available option.

The wireless communication device may receive the options (S165) and present them on a display of the wireless communication device. Once received, the customer can view these options on a browser, an application, as raw text, etc. A new application may be launched to display the options as well as the application used to initiate the association. A web interface such as a web browser may enable selection of options and other features that reside on a remote application server, via an internet connection on the wireless communication device. A text-based interface may include the ability to transmit commands via a textual medium, SMS messaging, a terminal, etc.

When an option is selected (S166) by a user of the wireless communication device, the selection may be transmitted to the POS terminal (S167). The POS terminal receives the selection, and may respond to the request (S168). In some example embodiments, this response may include adding a menu item (the selection) to a bill or an invoice, and alerting a staff member of the location. In other example embodiments, this response may include effecting payment (the selection) by communicating with a financial institution to perform a financial transaction, and acknowledging the payment and the location so that a staff member can verify a payment at the location. In further example embodiments, this response may include presenting further options, such as a sub-menu within the initially available options. If a bill is accumulated during the transaction, then the bill may need to be paid before the transaction ends (S169). The bill can be paid using the same process to select options, which allows a customer to order and pay the bill without relinquishing their wireless communication device.

Optionally, the customer may not select an option (S166), and the wireless communication device may not send a request at all. Maybe the customer did not like the option(s), or maybe the customer just wanted to make the association for future option selection. In this or similar scenarios, the transaction may end (S169), for instance after a time-out from the POS terminal. Alternatively, in some example embodiments, the wireless communication device may not receive any options from the POS terminal. In these and similar cases, the POS terminal may simply present information or advertising associated with the location, and the transaction may end after the information is transmitted.

Figure 2A:
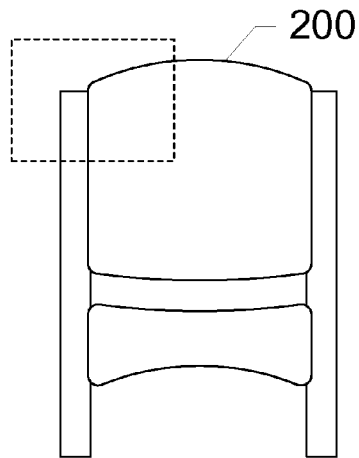
FIGS. 2A-2C show seating at a venue for facilitating a customer transaction, according to an example embodiment of the subject disclosure.
Figure 2B:
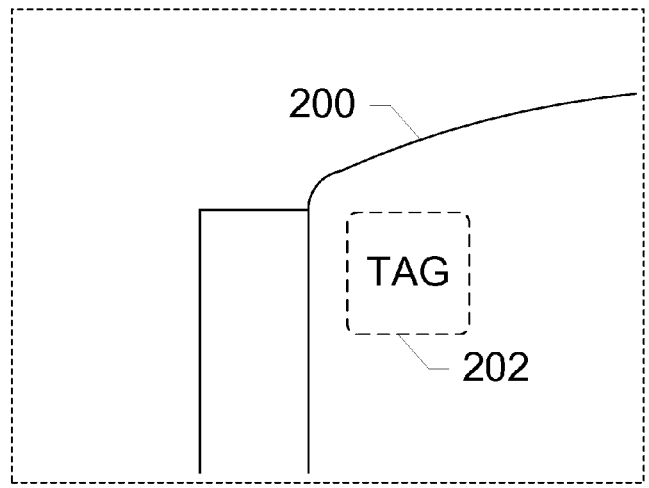
Figure 2C:
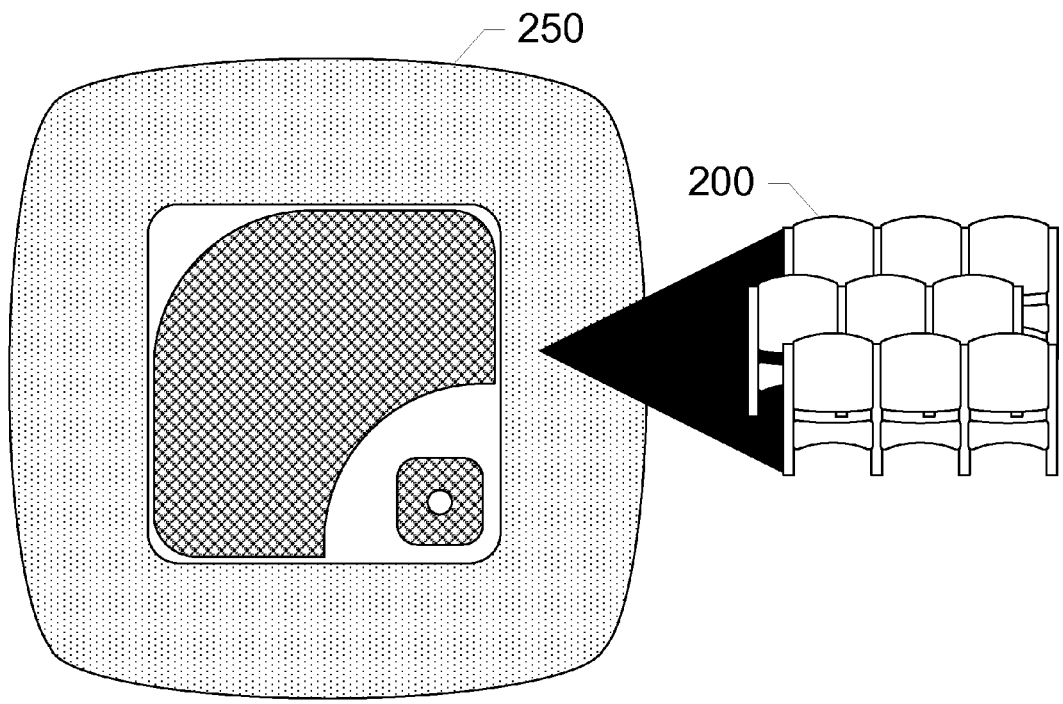

FIGS. 2A-2C show a seat 200 for facilitating a customer transaction, according to an example embodiment of the subject disclosure. Seat 200 may be useful for a customer attending an event such as a sporting event (e.g., baseball game) or a concert at a venue 250. FIG. 2A shows seat 200, while FIG. 2B shows an enlarged portion of seat 200 including a wireless tag 202. Wireless tag 202 may include any device or transceiver enabling communication with a wireless communication device used by the customer including, but not limited to, Wi-Fi, BLUETOOTH, near-field communication (NFC) tag, radiofrequency identification (RFID) tag, etc. Transceiver 202 may be hidden from view of the customer, but may have a symbol or logo affixed to stadium seat 200 to mark its presence or specific location. Transceiver 202 may use wireless technology to transmit an identifier to a wireless communication device, or to any reader or receiver in proximity of seat 200. The identifier may include a POS identifier (e.g., network address, web address, URL, etc.) of a POS terminal associated with the venue 250, and a location identifier of the location of seat 200. The location identifier in this case may be a unique identifier of seat 200, and/or a location relative to a plurality of seats of which seat 200 is a part. Further, the communication with transceiver 202 may be passive communication, i.e., without using an onboard power source, thereby relieving an operator of the venue of having to constantly maintain a charged battery on or power source to stadium seat 200. Alternatively, seat 200 may be powered via an external power source, thereby enabling active communication with transceiver 202. Wireless tag 202, if in the form of an NFC tag, may be read by an NFC reader on a wireless communication device used by the customer to conduct transactions with the POS terminal. Other types of readers may be available on the wireless communication device for other types of wireless tags 202 (e.g., camera for QR codes, barcode reader for barcodes, etc.).

FIG. 2C shows an example venue 250, which has many stadium seats having transceivers similar to seat 200. Each seat 200 in venue 250 may include a transceiver 202 having a unique identifier. Each identifier may include a POS identifier (e.g., network address) for the same POS terminal that is either on-site at venue 250 or off-site at another location. Each identifier may also include a location identifier of a location relative the other seats 200 in venue 250. In some example embodiments, the identifier may include, for example, a POS identifier of "www.venuePOSterminal.com", and a location identifier of "Section 228, Row J, Seat 11". In other example embodiments, the identifier may include, for example, raw or encoded information, such as "192.168.1.1", the IP address of the POS terminal, and "Xy2 Hz39c", the encoded physical address of the seat 200. In further example embodiments, the identifier may be a hybrid such as "www.venuePOSterminal.com/Xy2 Hz39c", which allows the POS terminal to associate the wireless communication device with the location simply by analyzing the network address used to contact the POS terminal. Many other variations of POS terminal addresses and seat identifiers are possible and may be conceived by those having ordinary skill in the art upon reading this disclosure.

In example embodiments of the subject disclosure, wireless tag 202 may use Near-Field Communication (NFC), which refers to a point-to-point wireless communication protocol. NFC readers are used to read information from NFC tags. NFC readers may also be capable of programming NFC tags with new information. NFC tags may be used in credit cards, kiosks, museum exhibits, passports, etc., and may be designed to provide information accessible by NFC readers, including authentication, transaction, identification, and other types of information. NFC tags may be a version of RFIDs, which may be utilized instead of NFC tags, as well as smartcards, universal integrated circuit cards (UICC), etc.

Figure 3:
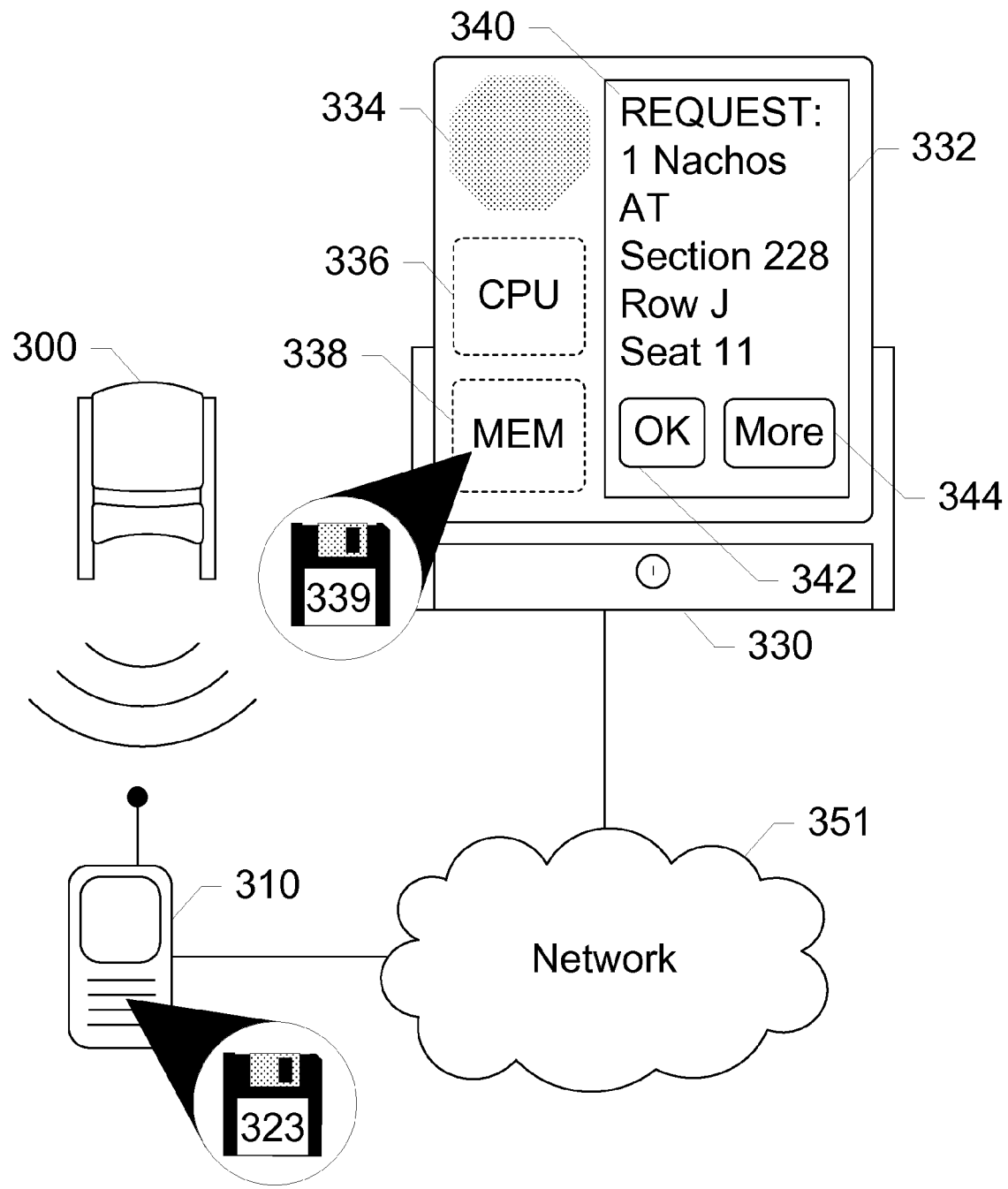
FIG. 3 shows a system for facilitating a customer transaction, according to an example embodiment of the subject disclosure.

FIG. 3 shows a system for facilitating a customer transaction, according to an example embodiment of the subject disclosure. The system may include a seat 300 having a wireless tag (not shown), a wireless communication device 310 including customer logic 323, and a point-of-sale (POS) terminal 330 including a display 332, a speaker 334, a processor 336, and a memory 338 storing POS logic 339. Network 351 may be a wireless network at the venue in wired communication with POS terminal 330, and in wireless communication with wireless communication device 310. Other features not shown for sake of simplicity but appreciated by those having ordinary skill in the art include peripheral devices, input and output devices, network elements, etc.

According to this example embodiment, a customer may use wireless communication device 310 to read the wireless tag of seat 300. The wireless tag transmits an identifier to wireless communication device 310 via any applicable method, including the methods described in this disclosure including, but not limited to, NFC, RFID, BLUETOOTH, Wi-Fi, ZIGBEE, etc. Customer logic 323 on wireless communication device 310 may extract, among other things, a POS identifier (e.g., network address) of POS terminal 330. Using the POS identifier, customer logic 323 may enable wireless communication device 310 to connect to POS terminal 330 through network 351, transmit the location identifier of seat 300 to POS terminal 330, receive options from POS terminal 330, and transmit requests to POS terminal 330. POS logic 339 on POS terminal 330 may associate wireless communication device 310 with the physical address of seat 300, send options to wireless communication device 310, and respond to requests from wireless communication device 310. A request 340 may require the attention of a staff member. In this and similar cases, POS terminal 330 may alert the staff member by displaying request 340 and the physical location of seat 300 on display 332. The example request 340 is for an order of nachos at Section 228, Row J, Seat 11. Once a staff member sees request 340, the staff member can activate OK button 342, which can send a confirmation of the request 340 to wireless communication device 310. Optionally, the staff member can activate more button 344, which gives the staff member more ways to respond to request 340, including requesting more details from wireless communication device 310, forwarding the order to another device on the network, etc. If the request 340 involves a fee, then POS terminal 330 may add the fee to a bill associated with both wireless communication device 310 and seat 300. If the request 340 involves a payment, then POS terminal 330 may perform a financial transaction to effect payment. Other options and features of POS terminal 330 and POS logic 339 will be readily appreciated by those having skill in the art in light of the subject disclosure.

Network 351 may include wireless and wired networks including, but not limited to, broadband wide-area networks such as WiMAX, Long Term Evolution (LTE), etc., cellular networks such as Universal Mobile Telecommunications Systems (UMTS), etc., local-area networks (LAN) such as Ethernet, Wi-Fi, etc., and personal area networks such as near-field communication (NFC), BLUETOOTH®, ZIG-BEE, etc. Communication across a network may be packet-based, and may include radio and frequency/amplitude modulations to enable communication between wireless communication devices using appropriate converters and other elements. A plurality of elements may host logic for performing tasks on the network. This logic may be programmed on a server, or a complex of servers. A particular logic unit is not limited to a single logical location on a network.

Figure 4:
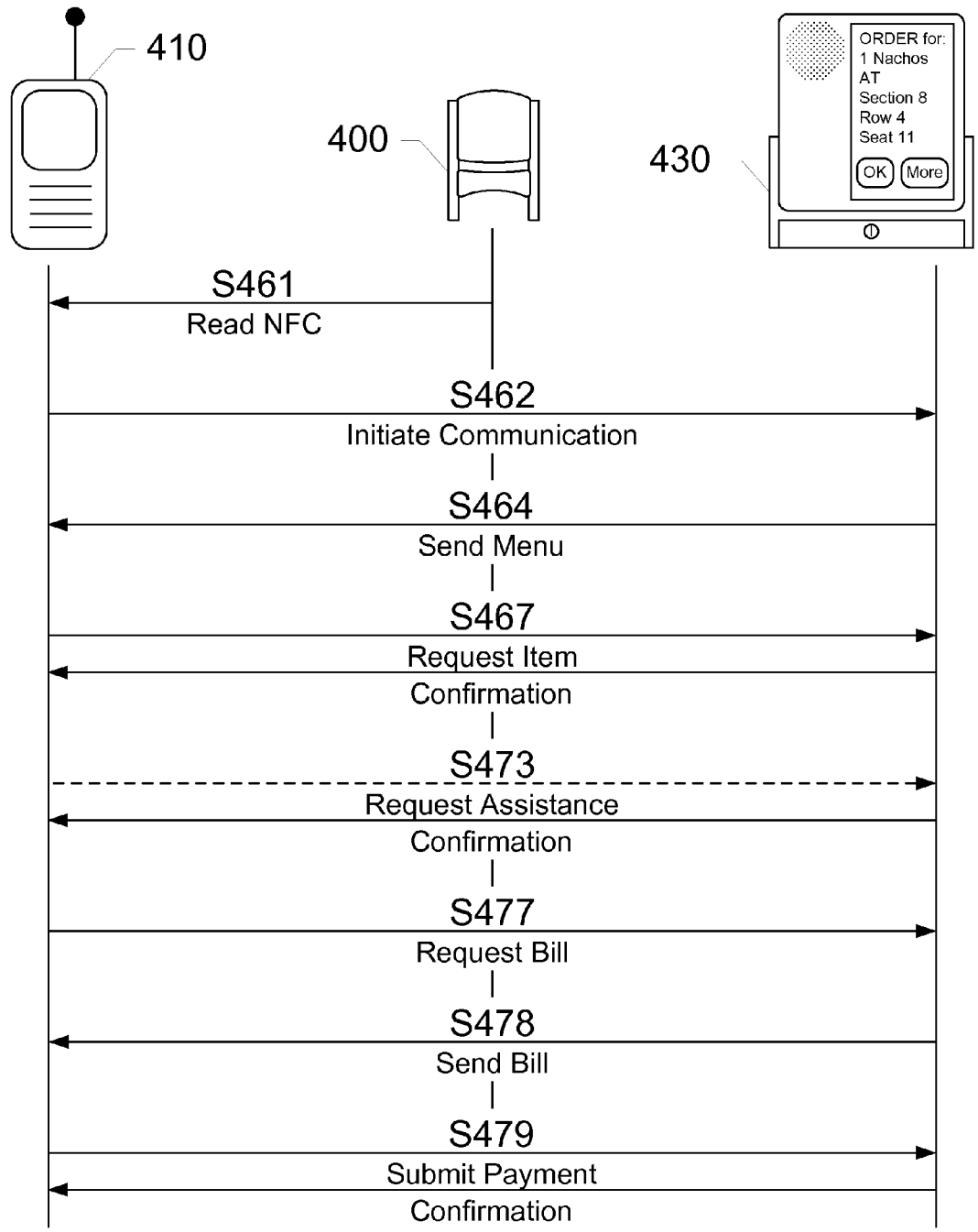
FIG. 4 shows a process flow diagram of a system for facilitating a customer transaction, according to an example embodiment of the subject disclosure.

FIG. 4 shows a process flow diagram of a system for facilitating a customer transaction, according to an example embodiment of the subject disclosure. The process may flow among and between a wireless communication device 410, a seat 400 having a wireless tag, and a POS terminal 430. When a customer sits down at stadium seat 400 in a venue, the customer may use wireless communication device 410 to read an identifier from the wireless tag coupled to seat 400 (S461), the identifier including a location identifier of seat 400 and a POS identifier (e.g., network address) of POS terminal 430. Wireless communication device 410 may include logic to follow the POS identifier to initiate communication with POS terminal 430 (S462) across a network. POS terminal 430 may respond to the initiation of communication from wireless communication device 410 by sending a menu of options, and/or any other information to wireless communication device 410 (S464).

The customer may view the menu of options and/or other information on a display of wireless communication device 410, and may make one or more selections. Upon receiving a customer selection of an item from the menu, logic stored on wireless communication device 410 may submit a request for the item (S467) to POS terminal 430. POS terminal 430 may return a confirmation when the request is received, and perform appropriate actions in response to the customer's request. If the customer indicates a need for help via the menu of options, then wireless communication device 410 may submit a request for assistance to POS terminal 430 (S473), which responds appropriately, and may transmit a confirmation of such a response back to wireless communication device 410.

When the customer selects an option to pay the bill, wireless communication device 410 may submit a request for the bill (S477) to POS terminal 430. POS terminal 430 may then respond by transmitting the bill (S478), including itemized transaction information, to wireless communication device 410. In some example embodiments, the POS terminal 430 may generate a bill by calculating a total of all items ordered or services rendered, create a record of the bill in a pending bill database, transmit copies of the bill to staff members, initiate timers for bill payment, etc. before, during, or subsequent to transmitting the bill (S478) to wireless communication device 410. Wireless communication device 410 may receive the bill and display it for the user to review before confirming payment. If needed, the customer may request assistance (S473) with wireless communication device 410 while reviewing the bill. Again, POS terminal 430 may respond by initiating assistance procedures, while transmitting a confirmation that assistance is being provided. Once the customer is satisfied with the bill and confirms payment on wireless communication device 410, payment information may be submitted (S479) from wireless communication device 410 to POS terminal 430 via the network. The payment information may include a copy of the bill, as well as information for one or more payment accounts owned by the customer, such as credit cards, bank accounts, gift certificates, etc. The payment information may further include additional instructions such as a partial amount, a request for a receipt, a tip amount, etc. POS terminal 430 may receive the payment information, complete the transaction, and send the confirmation of the transaction to wireless communication device 410.

In another example embodiment, each table at a restaurant may include a wireless tag, such as an NFC tag, bar code including an identifier, smart card, or more elaborate hardware such as a processor, memory, and transceiver for communicating with a wireless communication device. Including one or more wireless tags with the table may allow a customer to sit down at the table, use his wireless communication device to read the wireless tag, and launch a browser or application session for the restaurant. Using the wireless communication device, the customer can see a menu, place an order, summon a waiter, pay the bill, etc., for the whole table, or for his seat. For instance, example embodiments enable bills to be split among the people seated at different seats at the table, or pay the bill in portions. These example embodiments are particularly useful in situations where chairs change place frequently. Other example embodiments couple wireless tags to individual placements at each table in a restaurant.

Figure 5C:
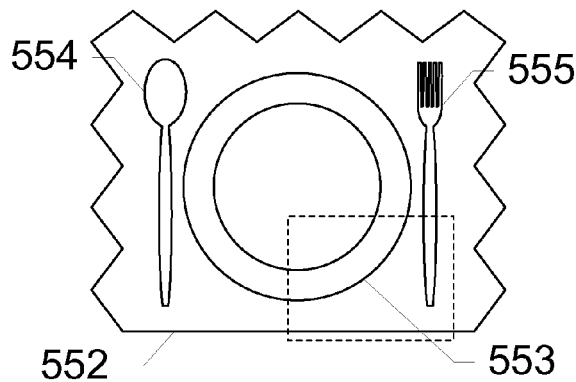
Figure 5C:
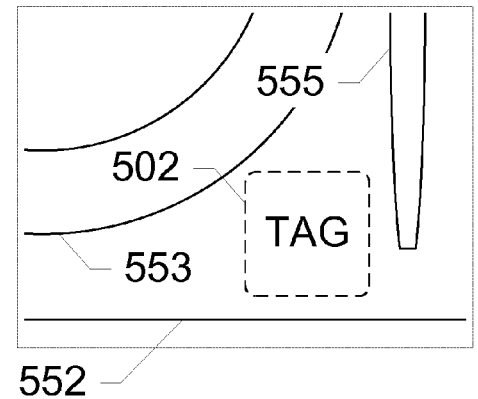
Figure 5C:
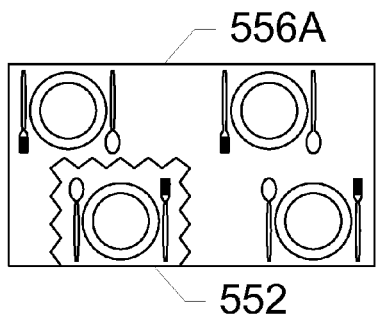
Figure 5C:
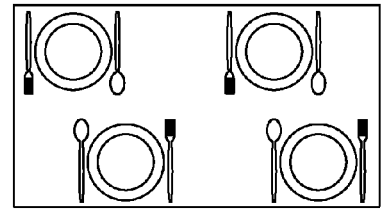
Figure 5C:
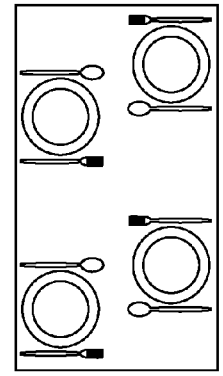
Figure 5C:
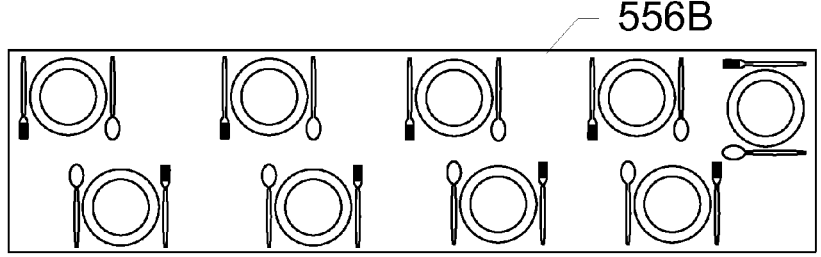
Figure 5C:
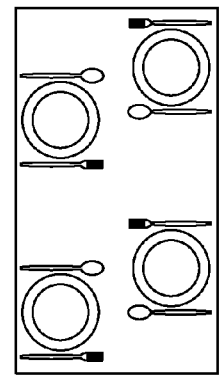
Figure 5C:
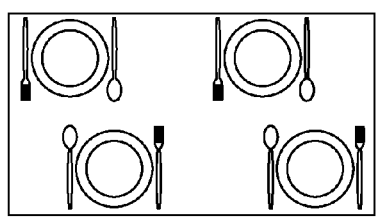
Figure 5C:
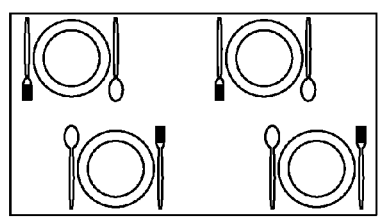

FIGS. 5A-5C show a placement 552 at a table 556A in a restaurant for enhancing a customer experience, according to an example embodiment of the subject disclosure. FIG. 5A shows a cutaway of placement 552 including a plate 553, a spoon 554, and fork 555. FIG. 5B shows an enlarged view of a portion of placement 552, which may include a wireless tag 502. Wireless tag 502 may include an identifier having a POS identifier of the restaurant POS terminal and a location identifier of placement 552. FIG. 5c shows an example of placement 552 as one of four placements at table 556A, which is one of six tables of its size, along with larger table 556B. When combined with table 556B, the total number of placements may be 33. Each of the 33 placements at the restaurant may have its own specific wireless tag storing an identifier, with each identifier indicating the same POS identifier of the restaurant POS terminal, and a unique location identifier corresponding to the respective physical address of the respective placement.

With the wireless tags 502 coupled to each placement 552 at each table 556A, simply shifting the positions of chairs would not require reprogramming each wireless tag 502. Wireless tag 502 would be positioned just in front of the customer, where wireless tag 502 can be easily read by a wireless communication device used by the customer. In some example embodiments, a wireless communication device may automatically detect the presence of the wireless tag and alert the customer accordingly, or launch an application or browser. The wireless communication device may further automatically receive the identification information from wireless tag 502, initiate communication with the POS terminal of the restaurant, and potentially summon a staff member to take the customer's order. For groups of customers having one individual desiring to pay for the whole bill, example embodiments of the restaurant POS terminal may present an option to not only pay, but also handle ordering for one or more placements 552 at the table 556A. Optionally, customers may accept or deny this other customer's offer to pay and/or order. In these examples, besides communicating with wireless tag 502 and the restaurant POS terminal, the customer's wireless communication device may further communicate with his dining partners' devices, via any wireless communication technology. Moreover, a payment or mobile wallet server on a cellular or wide-area network may handle multiple ordering and/or bill splitting, with any changes made by one device being reflected in the neighbor's devices. In further embodiments, parental controls may be stored on the wireless communication device to only accept parent wireless communication device offers.

In other example embodiments, customers can simply link bills so that one collective bill is created for an entire table. Customers linked together at this table may view the collective bill and order on behalf of all customers linked together at the table. Linked customers may pay for the entire collective bill, or any portion thereof until the collective bill is paid in full. Each customer may still pay his individual portions through his own wireless communication device by simply refraining from linking to the collective bill. All of these features may be facilitated via wireless communication between the customers' wireless communication devices, or by a centralized payment server that is accessible to the wireless communication devices via a network.

Figure 6A:
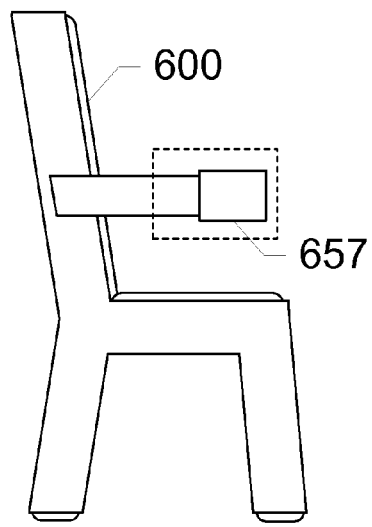
FIGS. 6A-6D show a seat having an identifier for facilitating a customer transaction, according to an example embodiment of the subject disclosure.
Figure 6B:
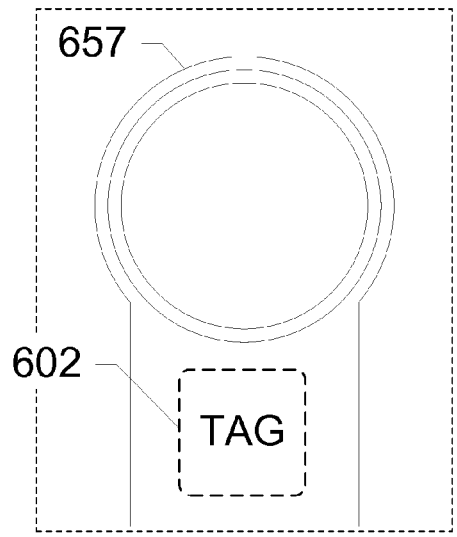
Figure 6C:
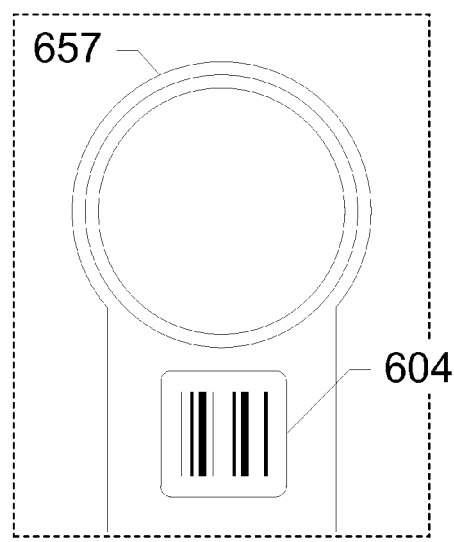
Figure 6D:
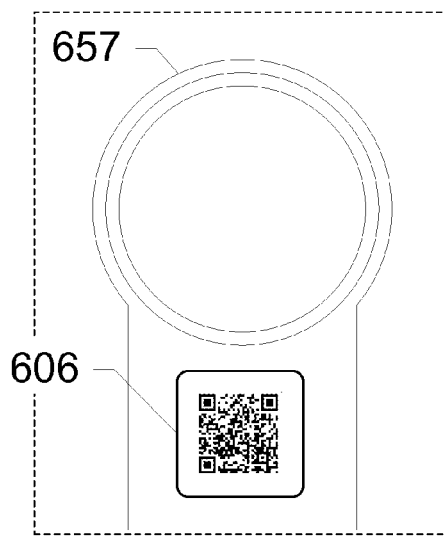

FIGS. 6A-6D show a seat or chair 600 having a wireless tag including an identifier for facilitating a customer transaction, according to an example embodiment of the subject disclosure. FIG. 6A shows chair 600 including a cup holder 657. FIG. 6B shows an enlarged overhead view of cup holder 657. Wireless tag 602 may be coupled just below cup holder 657, where it is in front of the customer. However, the exact position is not important, and may be anywhere on or near chair 600, as long as the customer has some knowledge and/or convenient access to wireless tag 602. This placement may be particularly useful in example embodiments where the wireless tag is marked with a symbol or logo and therefore clearly visible to the customer. FIG. 6C shows another type of wireless tag that benefits from a frontal placement. Bar code 604 may be positioned substantially similarly to wireless tag 602, and may be scanned by a wireless communication device. Wireless communication devices equipped with either a camera or an infrared scanner may read bar code 604 by positioning bar code 604 within viewing range of the camera or scanner. FIG. 6D shows a QR code 606, which may also be read by a wireless communication equipped with a camera or other QR code reader.

Bar code 604 and QR code 606 may be useful for some restaurants, theaters, multi-use venues, etc. that experience frequent changes in chair placement. Stickers with the designated bar code may be affixed to the chair during or after manufacturing or purchase of the chair. In other example embodiments, a field-programmable NFC tag is coupled to the chair. The field-programmable NFC tag may be reprogrammed with an identifier depending on the current placement of the chair. In addition to dedicated NFC programming devices, many wireless communication devices may be equipped with an NFC programmer, which may be used to dynamically reprogram an NFC tag.

Other types of wireless tags, both static and dynamic, will become apparent to those having skill in the art upon reading this disclosure. For each type of wireless tag, example embodiments may include wireless communication devices equipped to read the wireless tag. There are many other suitable wireless tags. In example embodiments, wireless tags include, but are not limited to, programmable wireless tags of differing technology and standards such as RFID, BLUETOOTH, ZIGBEE, Z-WAVE, etc.

Figure 7A:
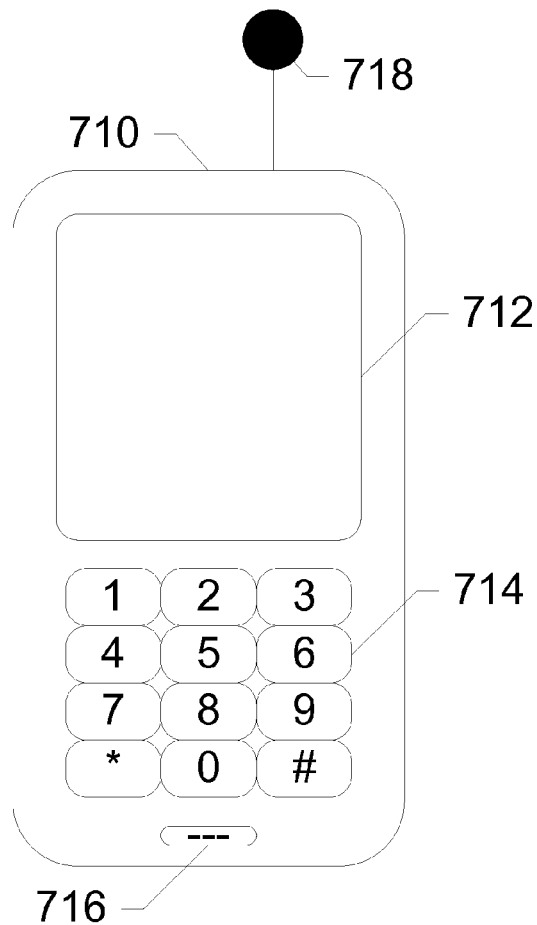
FIGS. 7A-7B show a wireless communication device for facilitating a customer transaction, according to an example embodiment of the subject disclosure.
Figure 7B:
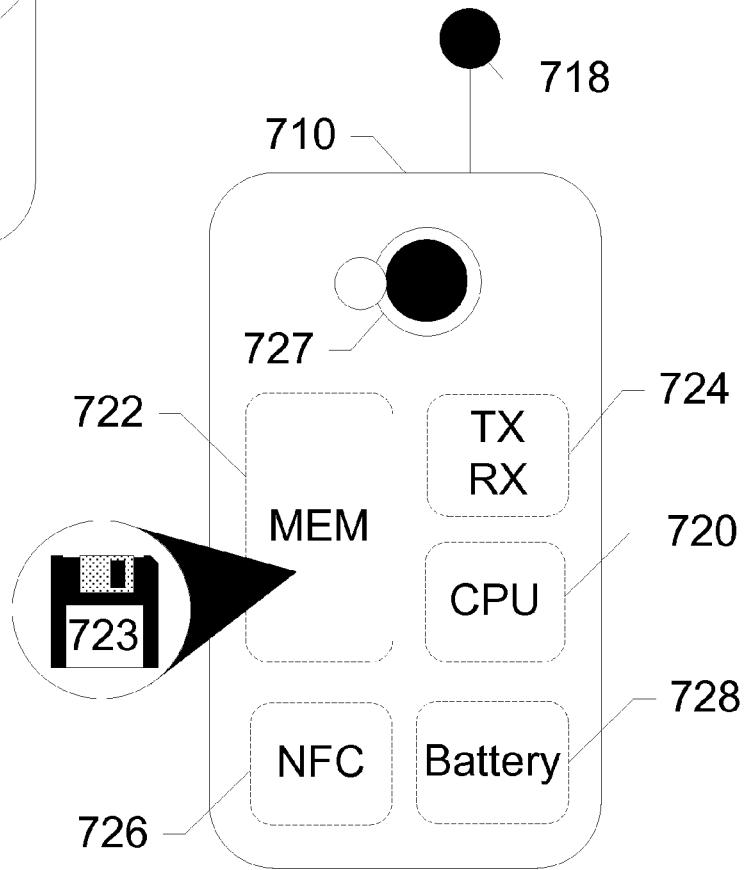

FIGS. 7A-7B show external and internal components, respectively, of a wireless communication device, according to an example embodiment of the subject disclosure. The wireless communication device generally refers to any electronic device capable of wirelessly sending and receiving information, such as cellular telephones, smart phones, personal digital assistants (PDAs), portable computers, etc. With reference to FIG. 7A, wireless communication device 710 may include a display 712, a keypad 714, a microphone 716, and an antenna 718. Display 712 may be a liquid crystal display (LCD) that serves as a visual output for the customer. Using display 712 the customer may view an interface for an operating system, customer applications, and notifications of service offers and changes. Keypad 714 may be an input for entering information and commands to wireless communication device 710. Microphone 716 may accept oral instructions and allow wireless communication device 710 to deliver voice communication to a network and other wireless communication devices. Antenna 718 may be a transducer for transmitting and receiving wireless radio frequency (RF) signals to and from wireless networks, network nodes, and other wireless communication devices.

With reference to FIG. 7B, inner components of a wireless communication device 710 may include a processor 720, a memory 722 storing a customer logic 723, a transceiver 724, an NFC reader 726, a camera 727, and a battery 728. Processor 720 may receive input and issue commands to deliver output through the other components. Examples of processors are, but are not limited to, computer processors (processing units), microprocessors, digital signal processors, controllers and microcontrollers, etc. Memory 722 may store information including customer logic 723 for enabling processor 720 to operate the other components of wireless communication device 710 to enhance a customer experience. Examples of memories may include RAM (random access memory), flash memories, ROMS (read-only memories), EPROMS (erasable programmable read-only memories), EEPROMS (electrically erasable programmable read-only memories), or any other storage device or medium. Customer logic 723 may include instructions that, when executed by processor 720, read or otherwise accept input from one or more of the other components to acquire an identifier, connect to a POS terminal to receive information and options, and send selected options to the POS terminal, among other things.

Transceiver 724 may convert wireless signals received by antenna 718 to information capable of being processed by processor 720 and vice-versa, and enable communication with a network and other wireless communication devices. In this and other example embodiments, wireless communication devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® enabled device.

Many wireless communication devices have more than one transceiver or a transceiver that supports more than one protocol. A single wireless communication device can support, for example, cellular radio frequency (RF), GSM, GPRS, UMTS, W-CDMA, LTE, NFC, WiFi, BLUETOOTH®, ZIGBEE®, and Z-WAVE® protocols, among others. A wireless communication device capable of multiple modes of wireless communication, such as cellular, WiFi, NFC, etc., may contain a plurality of antennas on a single device. For example, an NFC-enabled wireless communication device may have separate antennas for cellular and NFC communications.

NFC reader 726 may read NFC tags to acquire an identifier. Camera 727 may also read identifiers by taking a picture of a bar code sticker or QR code sticker. Once the bar code has been photographed, customer logic 723 may decode the identifier from the bar code, and follow the network address to a payment server. Battery 728 may power wireless communication device 710, and may be rechargeable via an external power source.

There are many embodiments of a wireless communication device that are capable of being used in accordance with the subject disclosure. In other embodiments of the wireless communication device, other displays may be used, such as an LED display, OLED display, etc. In some embodiments, the display may be used as a touch-sensitive input device, i.e., a touch screen. A touch screen allows the customer to view output on the display as well as use the display to provide input. In some touch screen embodiments the mobile device may not have a physical keypad for input. Instead, a virtual keypad may be displayed on the touch screen and the inputs by touching the virtual keys. Other forms of input, such as full keyboards, accelerometers, motion sensors, etc., may be utilized in the wireless communication device. The memory may be a non-removable internal memory, or a removable memory coupled to a SIM card or other memory card inserted into a memory card reader.

Figure 8:
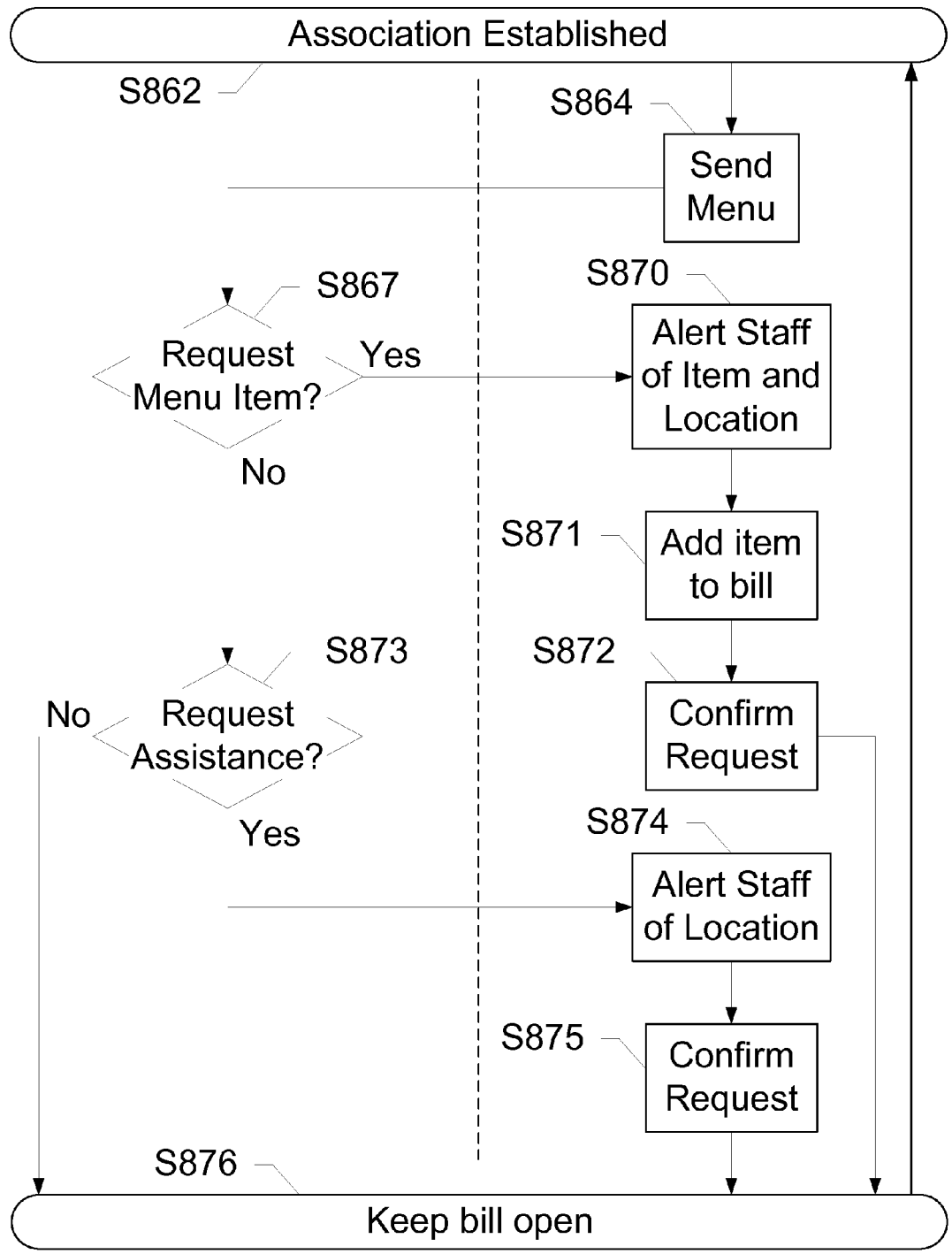
FIG. 8 shows a method for responding to a request, according to an example embodiment of the subject disclosure.

FIG. 8 shows a method for responding to a request, according to an example embodiment of the subject disclosure. In this example, a customer may use a wireless communication device to contact a POS terminal with an identifier including a location identifier of the location of the customer. Once an association is established at the POS terminal (S862), the POS terminal may send a menu (S864) to be presented to the customer through the wireless communication device via a network. The wireless communication device may receive the menu and present it to the customer to make a selection or place an order. Upon input from the user, the wireless communication device may transmit the menu item selection to the POS terminal (S867). The POS terminal may receive the selection, and in response may alert a staff member of the menu item and the location of the customer (S870). The POS terminal may then add the menu item to a bill associated with the wireless communication device and the location (S871), and send a confirmation to the wireless communication device (S872).

If the customer needs assistance with anything, then the customer can request assistance through the wireless communication device (S873). The wireless communication device may send a request for assistance to the POS terminal, which in response can then alert a staff member of the request for assistance and the location of the customer (S874). The POS terminal may send a confirmation to the wireless communication device while the staff member is contacted (S875). The customer may use the wireless communication device to make requests at any time, and a bill may be kept open (S876) until the customer is ready to pay the bill.

Figure 9:
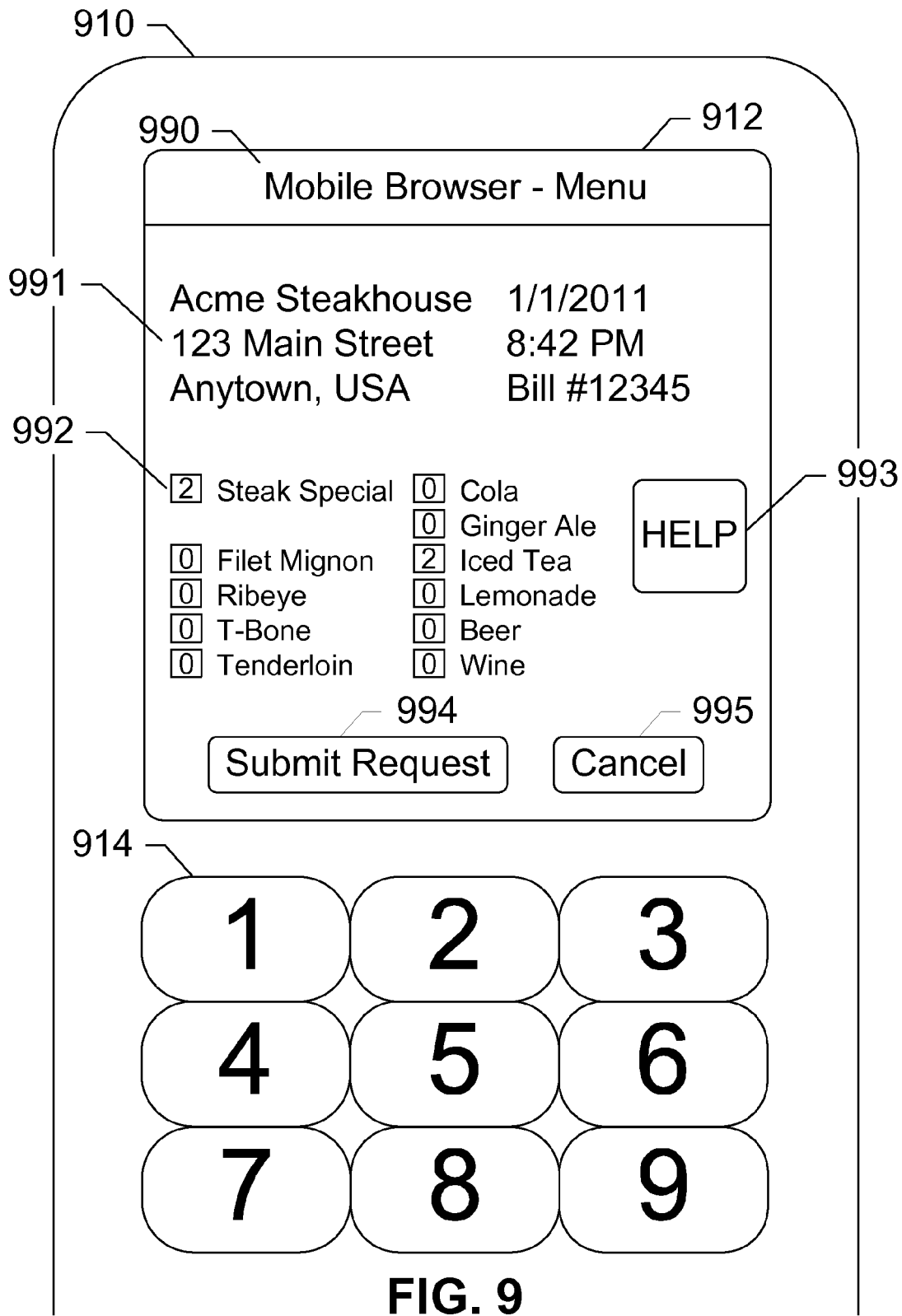
FIG. 9 shows a screen shot of a menu, according to an example embodiment of the subject disclosure.

FIG. 9 shows a screen shot of a menu 990, according to an example embodiment of the subject disclosure. Menu 990 may be presented to the customer via a browser program displayed on display 912 of wireless communication device 910, via an application installed on a memory of wireless communication device 910, etc. Menu 990 may include general information 991, such as the name and address of the restaurant along with the date, time, and bill number. Menu 992 may further include the items available for order with boxes next to each item. In case the customer wants more than one of the items, the customer can input a quantity into the box next to that item on the bill. In this example embodiment, "Steak Special" is at the top of the menu with a quantity of "2" in the box to the left. This means that the customer intends to order two "Steak Specials". If the customer only wanted one "Steak Special", then a number "1" would have been inserted into the box to the left. Once the customer has input the quantity of items to order, a submit request button 994 may complete the transaction upon activation by the customer. If the customer does not wish to complete the transaction, or needs to use wireless communication device 910 for something else, then cancel button 995 may be activated. A help button 993 is activated in case the customer needs assistance. Buttons 993 and 995 may be activated by manipulating the keys of keypad 914 or any other input that may be available such as, but not limited to, touch screen technology, accelerometer input, etc.

In other example embodiments, sub-menus and options to link, order, and/or pay for other bills may also be available for selection within the menu. To access a sub-menu or link another bill, a button corresponding to the sub-menu can be activated through the keypad, a touch screen, or other input of the wireless communication device. The POS terminal may respond with either the sub-menu, or a list of other bills at the table. Another button may appear in the menu, which can be activated to request the bill and start the payment process. This button may appear next to the submit request button, or, as the restaurant nears closing time, may replace the submit request button.

The menu displayed for the customer may be generated in many different ways according to different embodiments. For simplicity, menu 990 may be created through a web portal. Thus, the network address of the identifier may simply be a URL to a web application within the POS logic hosted on the POS terminal. The web application may be viewed on a mobile browser, and the URL may simply be an HTTP address. In other embodiments, a dedicated program may reside on the wireless communication device, which may communicate with the POS terminal through simple XML or SMS messages. Many other ways of transmitting options and requests between the wireless communication device and the POS terminal are recognizable to those having skill in the art upon consideration of the present subject disclosure.

Figure 10:
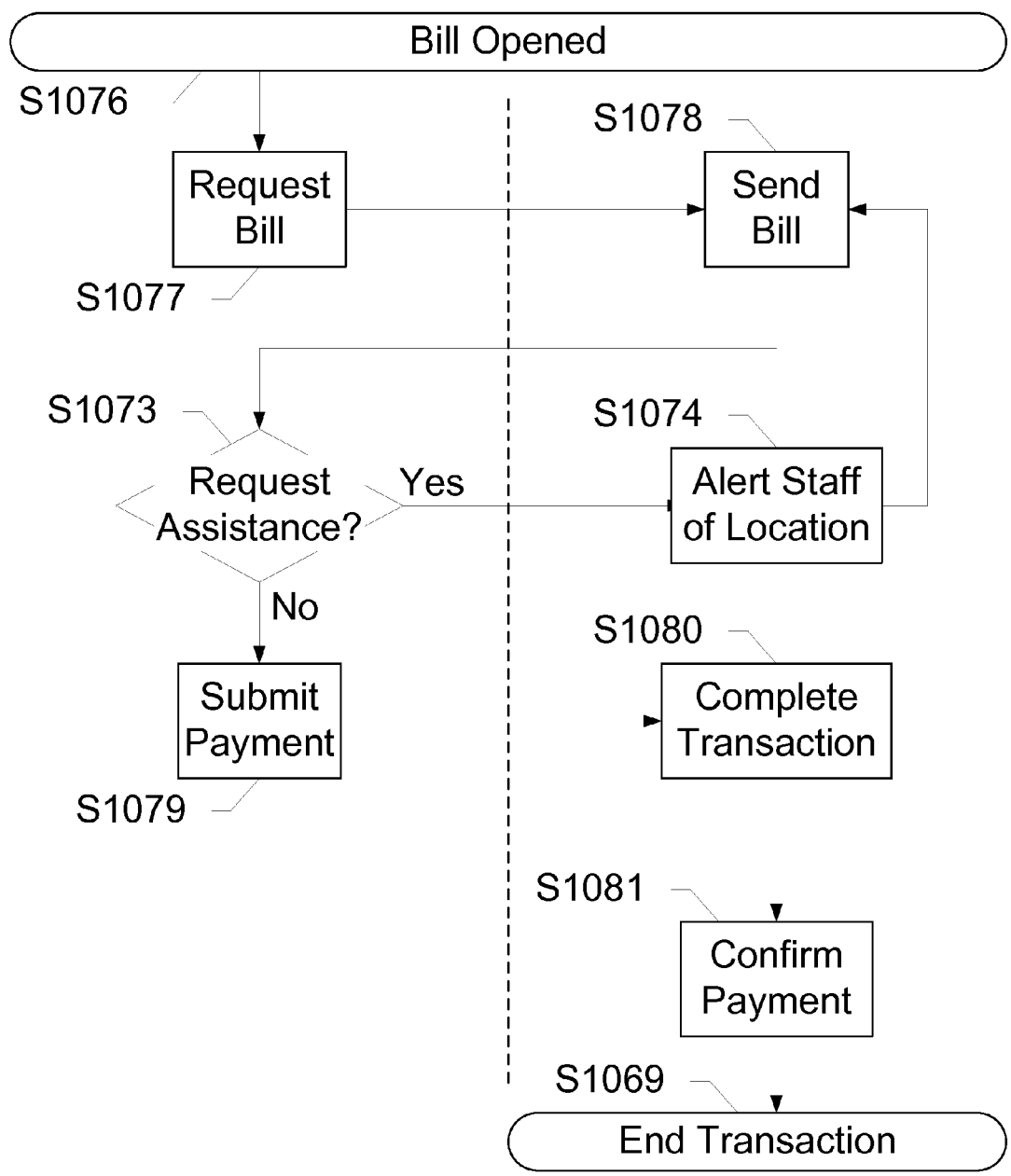
FIG. 10 shows a method for accepting payment, according to an example embodiment of the subject disclosure.

FIG. 10 shows a method for accepting payment, according to an example embodiment of the subject disclosure. A customer may use a wireless communication device to send requests for menu items to a POS terminal. The POS terminal may open a bill associated with the wireless communication device and the location of the customer (S1076). When the customer is ready to pay the bill, the wireless communication device may send a request to the POS terminal for the bill (S1077). The POS terminal may receive the request, and respond by sending the itemized bill (S1078) back to the wireless communication device. If the customer has any questions about the bill or the payment process, then the customer can request assistance via an application or browser interface on the wireless communication device, which in response transmits the request for assistance to the POS terminal (S1073). The POS terminal may receive the request for assistance, and alert a staff member of the request and the location (S1074). In either case, the customer may review the bill, add a tip, and submit a payment for the bill to the POS terminal (S1079). The POS terminal may receive the payment information, along with any further information or requests, and complete the transaction (S1080). Once the POS terminal completes the transaction (S1080), a confirmation may be sent from the POS terminal to the wireless communication device (S1081) through the network. At the end of the transaction (S1069), the POS terminal may alert a staff member of the payment, or simply make this information available to the staff. When the customer proceeds to leave, the staff member can simply check the POS terminal to make sure the bill has been paid.

The customer may pay using a credit card, digital wallet, or any other form of electronic payment on the wireless communication device. The customer may submit any required payment information, such as credit card numbers, PIN numbers, passwords, etc. using a browser, application interface, etc. Upon receipt of the payment information, the POS terminal may complete the transaction by communicating with financial institutions such as bank servers and credit card servers to effect payment. These and other methods of effecting payment may be found in commonly owned U.S. patent application Ser. No. 12/615,864, filed Nov. 10, 2009, which is hereby incorporated by reference herein in its entirety into this disclosure.

In some example embodiments, the POS terminal can alert staff members when a wireless communication device associated with an open bill has left the restaurant. The POS terminal in these embodiments may monitor the location of wireless communication devices associated with an open bill, or may at least determine that a wireless communication device is out of its range. The POS terminal may compare a location of the wireless communication device with a geofence. A geofence refers to an area defined by GPS coordinates or other positioning systems. The coordinates of this geofence may be set so that the geofence encompasses, for example, the restaurant or dining area within the restaurant. When the position of a wireless communication device is outside of the geofence, it is likely that the customer has left the restaurant. Using this POS terminal, staff members can be alerted very soon after the customer leaves.

Many wireless communication devices restrict access to positioning information. For this reason, the POS terminals in further embodiments may request the wireless communication device for access to its positioning information in order to open a bill. While this requirement may seem invasive in some businesses, positioning information may be necessary in other businesses, and may be subject to approval by the customer via a prompt displayed on the wireless communication device on a case-by-case basis, or by a subscription service enabling selected merchants or vendors to access the location information.

Figure 11:
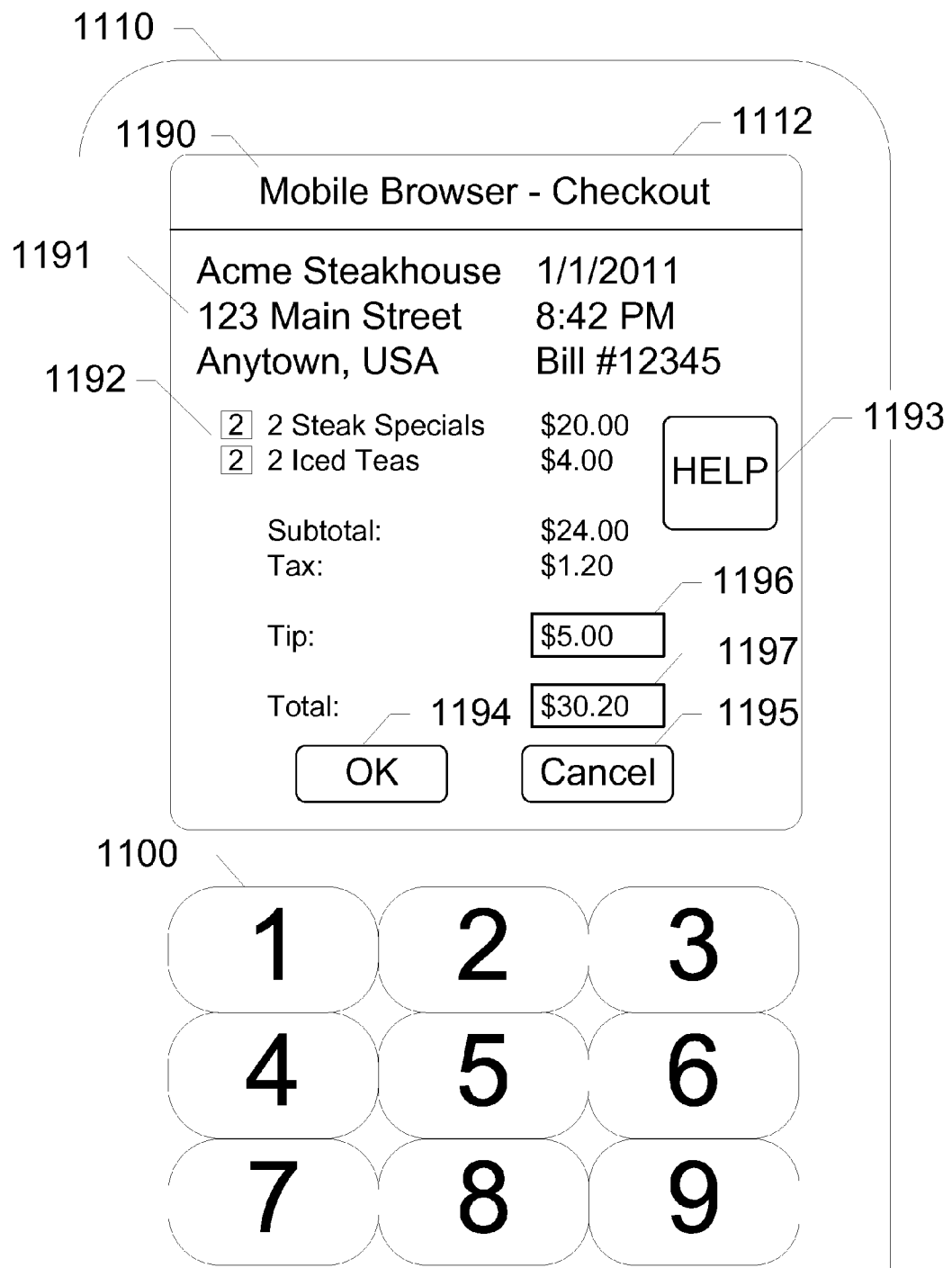
FIG. 11 shows a screen shot of a checkout, according to an example embodiment of the subject disclosure.

FIG. 11 shows a screen shot of a checkout 1190, according to an example embodiment of the subject disclosure. Checkout 1190 may be accessed via a browser program or other user interface/application viewed on display 1112 of wireless communication device 1110. Checkout 1190 may include general information 1191, such as the name and address of the restaurant along with the date, time, and bill number. Order information 1192 may include the menu items ordered with boxes next to each item. In case the customer only wants to pay for a portion of the total, the customer can input a quantity less than the total quantity of that item on the bill, through the keypad 1100 or other method. In this embodiment, "2 Steak Specials" are at the top with a quantity of "2" in the box to the left. This means the customer intends to pay for both "Steak Specials". If the customer only wanted to pay for one "Steak Special", then a number "1" would have been inserted into the box to the left.

Once the customer has input the quantity of items to pay for, in this case the entirety, then the customer may input a tip 1196. The price of the food is added to the amount of the tip 1196 to determine a total 1197 for the bill. The tip can be automatically set to 10%, 15%, 20%, etc., or manually set by the customer. With total 1197 determined, the customer may activate the OK button 1194, which is configured to complete the transaction upon activation. If the customer does not wish to complete the transaction, or needs to use wireless communication device 1110 for something else, then cancel button 1195 is activated. A help button 1193 may be activated in case the customer needs assistance. Buttons 1194 and 1195 can be activated by manipulating the keys of keypad 1110 or any other input that may be available such as touch screen technology, accelerometer input, etc. Taxes may be added automatically or provided as an additional amount, depending on the jurisdiction.

Payment may be facilitated by a digital wallet service, such as that described in U.S. patent application Ser. No. 11/727,493, filed Mar. 27, 2007, which is hereby incorporated by reference herein in its entirety into this disclosure.

Figure 12:
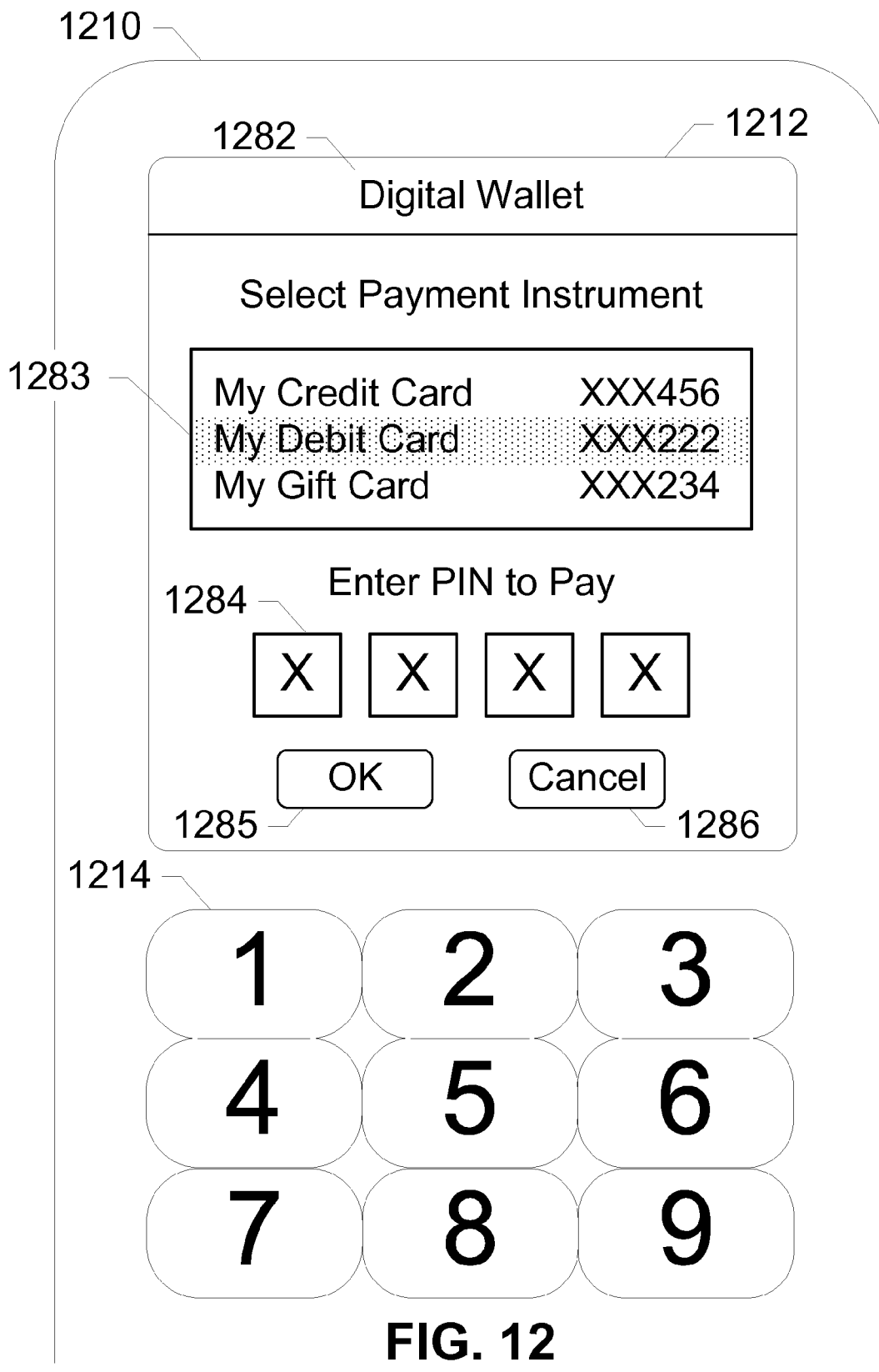
FIG. 12 shows a screen shot of a digital wallet, according to an example embodiment of the subject disclosure.

FIG. 12 shows a screen shot of a digital wallet, according to an example embodiment of the subject disclosure. Digital wallet 1282 may be an extension of the checkout in the example embodiment of FIG. 11. Digital wallet 1282 may be any application that facilitates transactions by storing a customer's credit card, debit card, bank account, and other financial information for use with electronic transactions. Digital wallet 1282 may include payment instruments 1283, including a debit card, a credit card, and a gift card, a security entry 1284, an OK button 1285, and a Cancel button 1286. Other options and commands will be apparent to those having ordinary skill in the art in light of this disclosure. When completing a checkout, digital wallet 1282 may be launched for payment instrument selection and security verification. The customer may select one of payment instruments 1283 using keypad 1214, or any other form of input. In this embodiment, the customer has selected My Debit Card XXX222 to pay for this transaction. When My Debit Card XXX222 is selected, security entry 1284 appears requiring a PIN to be entered. Once a PIN is entered, OK button 1285 may be activated to complete the transaction. If the customer does not wish to complete the transaction, then Cancel button 1286 may be activated, which may take the customer back to the checkout screen, as in FIG. 11. Real credit card and bank account numbers need not be stored on the device. Instead, temporary or random unique numbers may be issued by an application server on the network and provided to digital wallet application 1282. Other techniques for concealing sensitive account information will become apparent to those having ordinary skill in the art in light of the subject disclosure.

The devices, systems, and methods of the subject disclosure may be useful in a number of places of commerce outside of a venue, restaurant, or theater setting. For example, a municipality may place wireless tags at each parking meter in an area for wireless payment of parking meter fees. The municipality can observe infractions more easily, and users can monitor their remaining time in real-time. Further, the disclosed features may be enabled for security and authentication purposes that have utility beyond financial transactions, such as security barriers at concerts, museums, unlocking doors, accessing secure resources and data, etc. Other situations and settings for the devices, systems, and methods in the subject disclosure will become apparent to those having skill in the art upon consideration of this disclosure.

The foregoing disclosure of the example embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A point-of-sale terminal comprising:
a processor; and
a memory storing instructions that, when executed by the processor, cause the processor to perform operations comprising:
receiving, from a wireless communication device associated with a first customer, a request for a first bill associated with the first customer, the request comprising an identifier that identifies a location of the wireless communication device at a premises associated with the point-of-sale terminal, wherein the location is one of a plurality of unique locations at the premises and wherein the identifier is received by the wireless communication device from a wireless tag associated with the location at the premises,
responding to the request by sending the first bill to the wireless communication device, wherein the first bill is unpaid,
providing, to the wireless communication device, an option to link a second bill associated with a second customer to the first bill associated with the first customer to create a collective bill,
in response to a selection of the option by the first customer, providing, to the wireless communication device, a list of other bills for linking with the first bill associated with the first customer to create the collective bill, the list of other bills comprising the second bill associated with the second customer,
monitoring a current location of the wireless communication device based on positioning information associated with the wireless communication device while the first bill is unpaid,
comparing the positioning information with a geofence having coordinates encompassing the premises,
determining that the current location of the wireless communication device is outside the geofence, and
in response to determining that the current location of the wireless communication device is outside the geofence, providing an alert to a staff member to notify the staff member that the first customer has left the premises without paying the first bill.

2. The point-of-sale terminal of claim 1, wherein responding to the request further includes alerting the staff member of the request for the first bill.

3. The point-of-sale terminal of claim 1, wherein the request is received in accordance with a network address that identifies the point-of-sale terminal, wherein the network address that identifies the point-of-sale terminal is received from the wireless tag associated with the location at the premises associated with the point-of-sale terminal.

4. The point-of-sale terminal of claim 1, wherein the operations further comprise:
   requesting the wireless communication device for an approval to access the positioning information associated with the wireless communication device, wherein the approval, from the wireless communication device, to access the positioning information associated with the wireless communication device is required in order to generate the first bill; and
   generating the first bill in response to receiving, from the wireless communication device, the approval for the point-of-sale terminal to access the positioning information associated with the wireless communication device.

5. A method comprising:
   receiving, at a point-of-sale terminal comprising a processor, from a wireless communication device associated with a first customer, a request for a first bill associated with the first customer, the request comprising an identifier that identifies a location of the wireless communication device at a premises associated with the point-of-sale terminal, wherein the location is one of a plurality of unique locations at the premises and wherein the identifier is received by the wireless communication device from a wireless tag associated with the location at the premises;
   responding, by the point-of-sale terminal, to the request by sending the first bill to the wireless communication device, wherein the first bill is unpaid;
   providing, by the point-of-sale terminal to the wireless communication device, an option to link a second bill associated with a second customer to the first bill associated with the first customer to create a collective bill;
   in response to a selection of the option by the first customer, providing, by the point-of-sale terminal to the wireless communication device, a list of other bills for linking with the first bill associated with the first customer to create the collective bill, the list of other bills comprising the second bill associated with the second customer;
   monitoring, by the point-of-sale terminal, a current location of the wireless communication device based on positioning information associated with the wireless communication device while the first bill is unpaid;
   comparing the positioning information with a geofence having coordinates encompassing the premises;
   determining, by the point-of-sale terminal, that the current location of the wireless communication device is outside the geofence; and
   in response to determining that the current location of the wireless communication device is outside the geofence, providing, by the point-of-sale terminal, an alert to a staff member to notify the staff member that the first customer has left the premises without paying the first bill.

6. The method of claim 5, further comprising sending a menu to the wireless communication device of the first customer.

7. The method of claim 6, further comprising receiving an order for an item on the menu, and wherein the first bill comprises a price for the item.

8. The method of claim 7, further comprising alerting the staff member associated with the premises of the order for the item and the location of the first customer at the premises.

9. The method of claim 5, further comprising receiving, from the wireless communication device, information associated with a payment of the first bill.

10. The method of claim 9, further comprising alerting the staff member of the payment of the first bill.

11. The method of claim 5, further comprising:
    requesting, by the point-of-sale terminal, the wireless communication device for an approval to access the positioning information associated with the wireless communication device, wherein the approval, from the wireless communication device, to access the positioning information associated with the wireless communication device is required in order to generate the first bill; and
    generating, by the point-of-sale terminal, the first bill in response to receiving, from the wireless communication device, the approval for the point-of-sale terminal to access the positioning information associated with the wireless communication device.

12. A non-transitory computer-readable storage medium storing computer-executable instructions that, when executed by a processor of a point-of-sale terminal, cause the processor to perform operations comprising:
    receiving, from a wireless communication device associated with a first customer, a request for a first bill, the request comprising an identifier that identifies a location of the wireless communication device at a premises associated with the point-of-sale terminal, wherein the location is one of a plurality of unique locations at the premises and wherein the identifier is received by the wireless communication device from a wireless tag associated with the location at the premises;
    responding to the request by sending the first bill to the wireless communication device, wherein the first bill is unpaid;
    providing, to the wireless communication device, an option to link a second bill associated with a second customer to the first bill associated with the first customer to create a collective bill;
    in response to a selection of the option by the first customer, providing, to the wireless communication device, a list of other bills for linking with the first bill associated with the first customer to create the collective bill, the list of other bills comprising the second bill associated with the second customer;
    monitoring a current location of the wireless communication device based on positioning information associated with the wireless communication device while the first bill is unpaid;
    comparing the positioning information with a geofence having coordinates encompassing the premises;
    determining that the current location of the wireless communication device is outside the geofence; and
    in response to determining that the current location of the wireless communication device is outside the geofence, providing an alert to a staff member to notify the staff member that the first customer has left the premises without paying the first bill.

13. The non-transitory computer-readable storage medium of claim 12, wherein the operations further comprise providing a menu to the wireless communication device.

14. The non-transitory computer-readable storage medium of claim 13, wherein the operations further comprise receiving an order for an item on the menu.

15. The non-transitory computer-readable storage medium of claim 12, wherein the operations further comprise receiving, from the wireless communication device, a request for the staff member.

16. The non-transitory computer-readable storage medium of claim 12, wherein the operations further comprise:
    receiving, from the wireless communication device, information associated with a payment of the first bill; and
    alerting the staff member of the payment of the first bill.

17. The non-transitory computer-readable storage medium of claim 12, wherein the operations further comprise:
- requesting the wireless communication device for an approval to access the positioning information associated with the wireless communication device, wherein the approval, from the wireless communication device, to access to the positioning information associated with the wireless communication device is required in order to generate the first bill; and
- generating the first bill in response to receiving, from the wireless communication device, the approval for the point-of-sale terminal to access the positioning information associated with the wireless communication device.

\* \* \* \* \*